United States Patent [19]
Girguis

[11] 3,857,256
[45] Dec. 31, 1974

[54] MULTIPLE UNIVERSAL JOINT

[75] Inventor: Sobhy Labib Girguis, Troisdorf, Germany

[73] Assignee: Uni-Cardan A.G., Lohmar/Rheinl, Postfach, Germany

[22] Filed: Feb. 8, 1973

[21] Appl. No.: 330,480

[30] Foreign Application Priority Data
Feb. 8, 1972 Germany............................ 2205802

[52] U.S. Cl............................................ 64/21, 64/8
[51] Int. Cl.................................................. F16d 3/30
[58] Field of Search...................... 64/21, 8, 32 F, 7

[56] References Cited
UNITED STATES PATENTS

| | | | |
|---|---|---|---|
| 2,618,942 | 11/1952 | Dodge | 64/21 |
| 3,017,755 | 1/1962 | Miller | 64/21 |
| 3,324,683 | 6/1967 | Schroter | 64/21 |
| 3,464,232 | 9/1969 | Hutchinson | 64/21 |
| 3,593,541 | 7/1971 | Kuroda | 64/21 |
| 3,678,706 | 7/1972 | Shirley | 64/21 |
| 3,747,368 | 2/1973 | Morin | 64/21 |

FOREIGN PATENTS OR APPLICATIONS

| | | | |
|---|---|---|---|
| 329,900 | 5/1930 | Great Britain | 64/21 |

Primary Examiner—Samuel Scott
Assistant Examiner—Randall Heald
Attorney, Agent, or Firm—Edmund M. Jaskiewicz

[57] ABSTRACT

A universal joint consists of a plurality of constant velocity universal joints each having an outer joint element and an inner joint element with mutually opposed axially extending grooves in said elements. Balls are disposed in the grooves to transmit a torque between the joint elements and a cage is between the inner and outer joint elements of a universal joint to retain and guide the balls therebetween. Either the inner or outer joint elements of the constant velocity universal joints are connected to each other. Control means are provided for guiding the cages of two adjacent universal joints with respect to each other in such a manner that upon bending of the universal joint the axes of the cages will be bent at angles having a predetermined relationship to each other. The axes angles are subdivisions of the angle through which the universal joint is bent and may be equal to each other.

14 Claims, 15 Drawing Figures

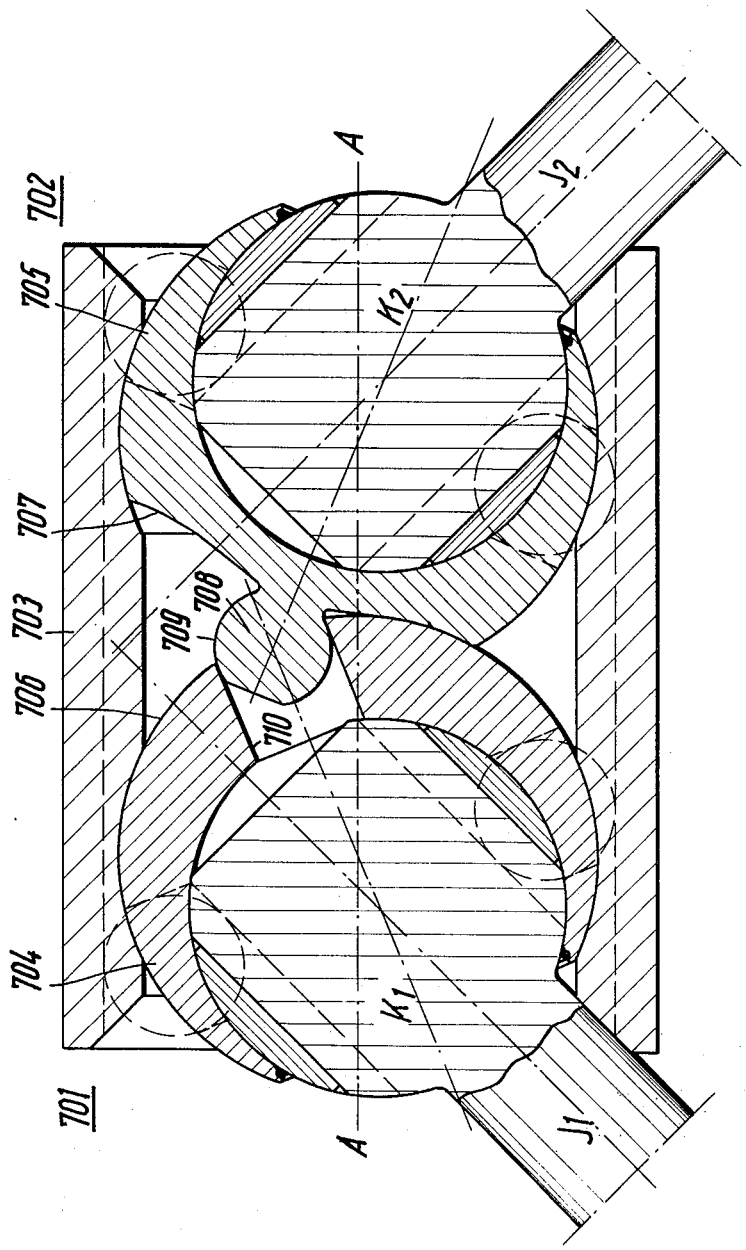

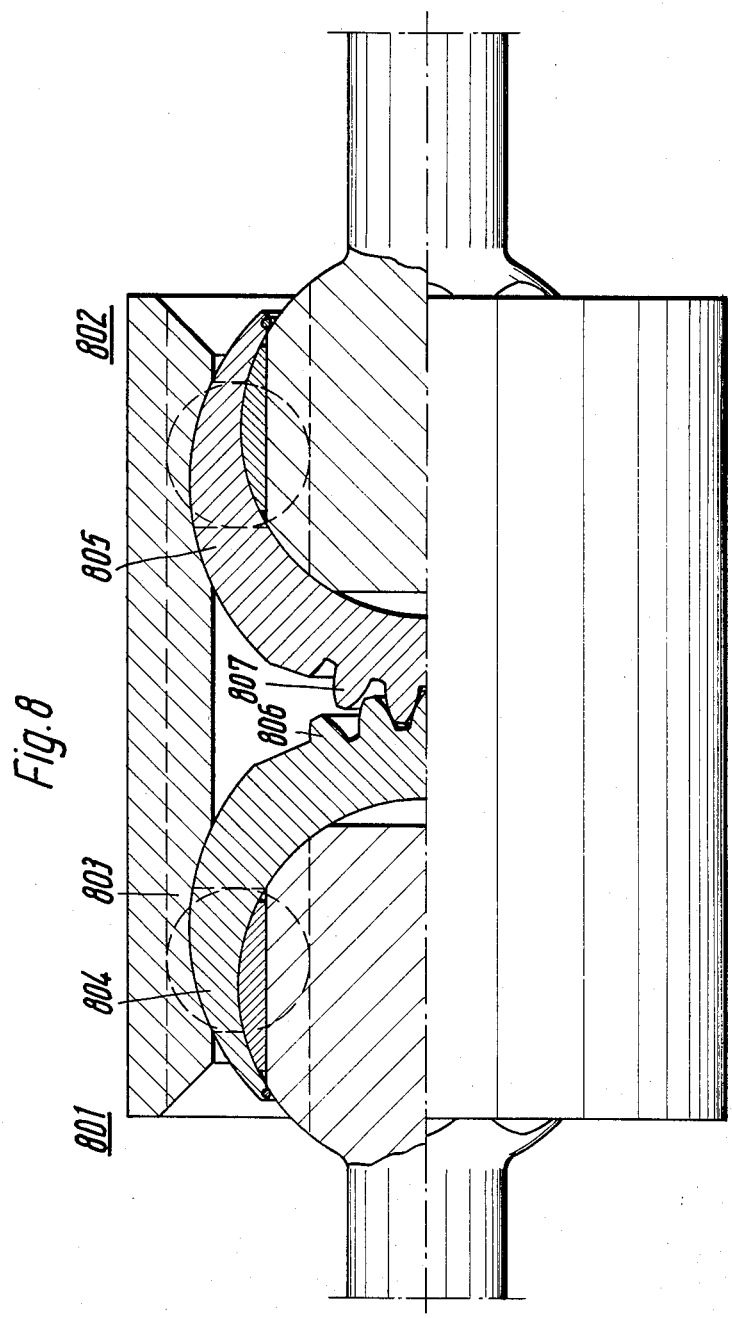

MULTIPLE UNIVERSAL JOINT

The present invention relates to a universal joint consisting of at least two constant velocity universal joints, more particularly, to guiding the cages of adjacent universal joints during bending of the universal joint.

Multiple or double universal joints have been constructed wherein two or more constant velocity universal joints are connected together. It has been proposed to construct the outer joint element for both universal joints as a unitary member and to connect the inner joint elements by means of two pins each of which is guided in a bore of an inner joint element and forming jointly a ball-joint at the other end of the pins. The balls retainer cage is not guided and both universal joints permit an axial displacement therebetween. An example of such a joint is shown in British Pat. No. 377 761.

However, this universal joint structure has the disadvantage of requiring distance for the movement in a radial direction of the inner joint elements that are coupled to each other. This large radial movement is necessitated by the two inner joint elements bending along the entire bending angle of the universal joint. As a result, when it is desired to use such a joint for large bending angles the joint must be constructed to have a relatively large size.

In addition, this relatively high amount of travel between the relative components of the universal joint throughout bending produces a correspondingly higher generation of heat and thermal stressing of the joint, particularly for those components that transmit the torque. This, in turn, results in a greater wear of the components which are directly involved in the control movement of the joint. Another disadvantage of such a universal joint is that the function of controlling the individual universal joints must also be performed by the components which transmit torque. In addition, additional components are generally required to satisfactory perform the control function. Further, it is not possible to utilize such a double universal joint as a fixed joint coupling.

The same comments as made above may also be made for another form of multiple universal joint wherein the inner joint elements are combined into a single component and the outer joint elements are movably connected to each other by sockets associated with the outer joint elements. An example of such a universal joint is shown in British patent 329 900. This universal joint also has the disadvantage that it must be very large in size in order to accommodate large bending angles.

It is therefore the principal object of the present invention to provide a novel and improved multiple universal joint which may consist of a number of interconnected constant velocity universal joints.

It is another object of the present invention to provide a multiple universal joint wherein the control and torque transmitting functions are performed by different components.

It is a further object of the present invention to provide such a multiple universal joint which significantly decreases the quantity of heat generated and thermal stressing in those components actually transmitting torque.

It is an additional object of the present invention to provide a multiple universal joint which significantly reduces the radial controlled movement of components connected movably to each other and which permits the greatest possible bending angle in the smallest possible joint so as to reduce the overall size of the joint.

The objects of the present invention are achieved and the drawbacks of the prior art as described above are overcome by the universal joint of the present invention. The universal joint according to the present invention may comprise a plurality of constant velocity universal joints of the fixed or sliding type. Each constant velocity universal joint has an outer joint element and an inner joint element with these elements having mutually opposed axially extending grooves in which are positioned balls for transmitting the torque between the joint elements. A cage is disposed between the inner and outer joint elements of each joint to retain and guide the balls therebetween. Either the inner or outer joint elements of the constant velocity universal joints are connected to each other. Control means are provided for guiding the cages of two adjacent constant velocity universal joints with respect to each other that during bending of the universal joint with respect to its straight line position the axes of the cages will assume angles which are subdivisions of the bending angle of the joint and which have a predetermined relationship to each other. Generally, this relationship will consist of the angles of the axes of the cages being equal.

The control of the constant velocity universal joints is accomplished by providing the cages with axial extensions on at least the ends of the cages facing each other with one extension being seated upon a guide surface within the extension of the other cage. The inner guide surface on a cage extension may be a concave spherical surface or a concave cylindrical surface and the guide surface on the other cage may comprise an outer spherical surface or maybe slightly convex.

With this construction the control travel is relatively small because the cages are guided movably with respect to each other in performing the control movement. In each instance, the cages traverse only one half of the bending angle of a constant velocity universal joint. This has the advantage of significantly reducing the thermal stressing of the inner and outer joint components which actually transmit the torque and to a more favorable dissipation of generated heat. The cage provides good dissipation of heat since it is surrounded by a lubricant and a relatively large cross-section of the cage is contacted by the lubricant.

Other objects and advantages of the present invention will be apparent upon reference to the accompanying description when taken in conjunction with the following drawings, which are exemplary, wherein;

FIG. 7 is a longitudinal sectional view of another form of a double universal joint according to the present invention;

FIG. 8 is a half-longitudinal sectional view of still another form of a double universal joint according to the present invention;

Proceeding next to the drawings wherein like reference symbols indicate the same parts throughout the various views a specific embodiment and modifications of the present invention will be described in detail.

Figure 1:
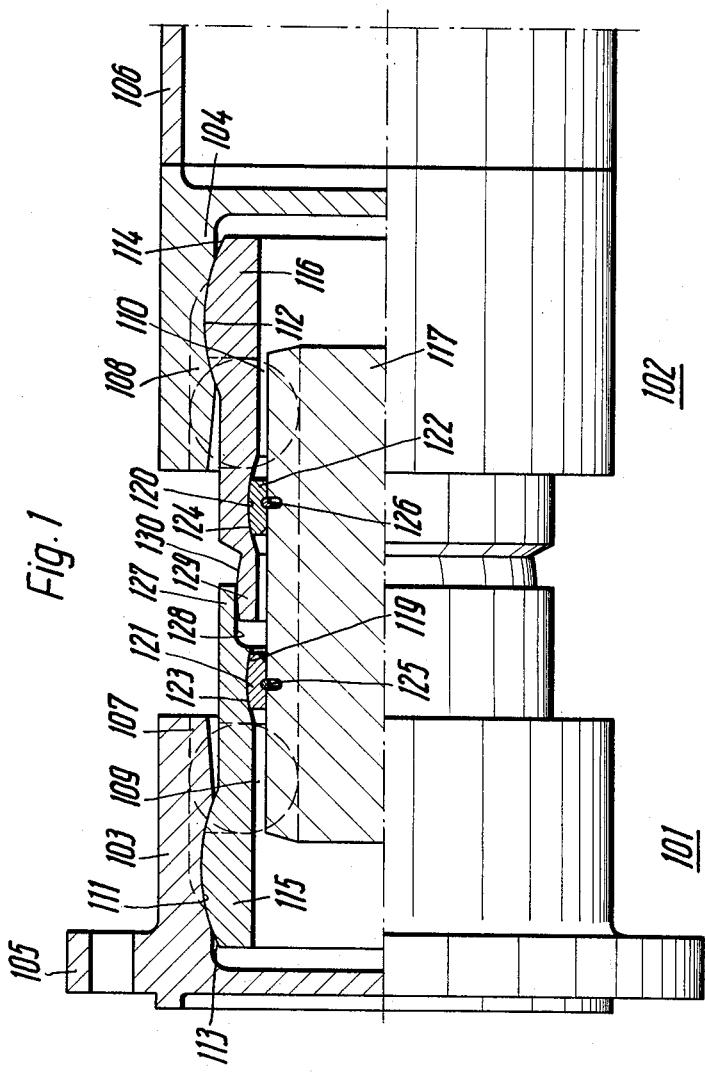
FIG. 1 is an elevational view of a double universal joint constructed as a fixed joint according to the present invention with a portion thereof being shown in a longitudinal section.
Figure 2:
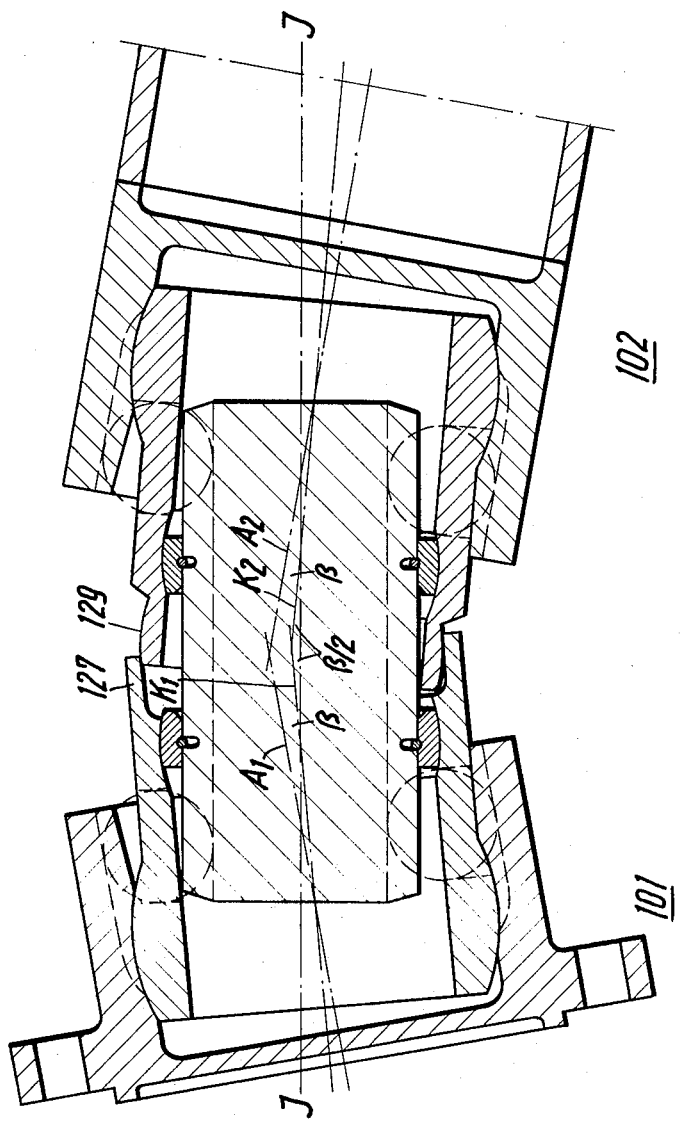
FIG. 2 is a longitudinal sectional view of the double universal joint of FIG. 1 showing the joint in a bent position.

The double universal joint shown in FIGS. 1 and 2 consists of two separate constant velocity universal joints 101 and 102 which have outer joint elements 103 and 104 respectively. Outer joint element 103 is provided with a flange 105 while a tubular articulated shaft 106 is attached to the outer joint element 104.

The outer joint elements 103 and 104 are provided with parallel axially extending grooves 107 and 108 which are distributed over the inner peripheral surfaces of the substantially concave cavities formed in the outer joint elements. Balls 109 and 110 are positioned in these grooves.

The outer joint elements 103 and 104 have inner concave spherical surfaces 111 and 112 upon which are movably mounted outer spherical surfaces 113 and 114 of balls retainer cages 115 and 116. The cages 115 and 116 retain the respective balls 109 and 110 and guide the balls into the homokinetic plane.

The universal joints 101 and 102 are provided with a one piece common inner joint element 117 which is also provided with parallel axially extending grooves 118 on its outer peripheral surface which grooves are mutually opposed from grooves 107 and 108 of the outer joint elements and within which are positioned the balls 109 and 110. The balls thus function to transmit torque between the inner and outer joint elements.

The cages 115 and 116, which are tubular in form, are provided with inner concave spherical surfaces 119 and 120 respectively which movably receive outer spherical surfaces 123 and 124 of control elements 121 and 122. The centers of the outer and inner spherical surfaces 113 and 119 of cage 115 are positioned equidistantly on both sides of a plane which passes through the centers of the balls 109 retained by cage 115. The same relationship for centers of the spherical surfaces also exists for cage 116.

The control elements 121 and 122 are in the form of rings or annular members and are mounted on the periphery of inner joint element 117 and are secured thereon against axial displacement with respect to the inner joint element by snap-rings 125 and 126 positioned in grooves of the respective control elements and the joint element. Since the control elements are secured against axial displacement this double universal joint is of the fixed joint type.

From one end of cage 115 of universal joint 101 there is an axial extension 127 provided with a cylindrical bore 128. The adjacent end of cage 116 of universal joint 102 is also provided with an axial extension 129 having a spherical outer surface 130. The outer spherical surface 130 of extension 129 is guided in the cylindrical bore 128 of extension 127 and the center of spherical surface 130 is approximately equidistant from the centers of both universal joints 101 and 102.

By the guiding of cages 115 and 116 with respect to each other by means of their extensions 127 and 129 the total bending angle of the universal joint is subdivided into two approximately equal angles. Since each cage 115 and 116 traverses only one half of the bending angle ($\beta/2$) of a constant velocity universal joint 101 or 102, the radial movement of extensions 127 and 129 during bending is relatively small. The axis $K_1$ or $K_2$ of a cage assumes under bending in each case only one half of the bending angle of an axis $A_1$ or $A_2$ of outer joint element 103 or 104 with respect to the straight line position of the joint as indicated by axis J — J. This relationship exists if the bending angle is divided into two equal parts.

The division of the total bending angle to the separate universal joints in order to obtain a predetermined particular relationship between the divided angles can be obtained through various means such as by a suitable differential dimensioning of the effective lever arms of the extensions of the cages. A total bending angle can thus be subdivided in a predetermined manner by means of a combination of separate constant velocity universal joints having certain maximum bending angles and by a suitable adaptation of the cages of the separate universal joints so as to produce a multiple universal joint. A multiple universal joint can then be constructed from two or more separate universal joints merely by modifying the cages of the separate universal joints according to the present invention. In a series arrangement of several separate constant velocity universal joints the control of the individual cages can be obtained by additional structures which will be subsequently described in detail.

By mounting the adjacent cages of the universal joints of FIG. 1 against axial movement with respect to each other any further attachment of the cages against axial movement with respect to the inner or outer joint elements becomes unnecessary. Further, the universal joint can now be employed as a fixed joint coupling where a unitary inner joint element is provided as in FIG. 1.

Figure 3:
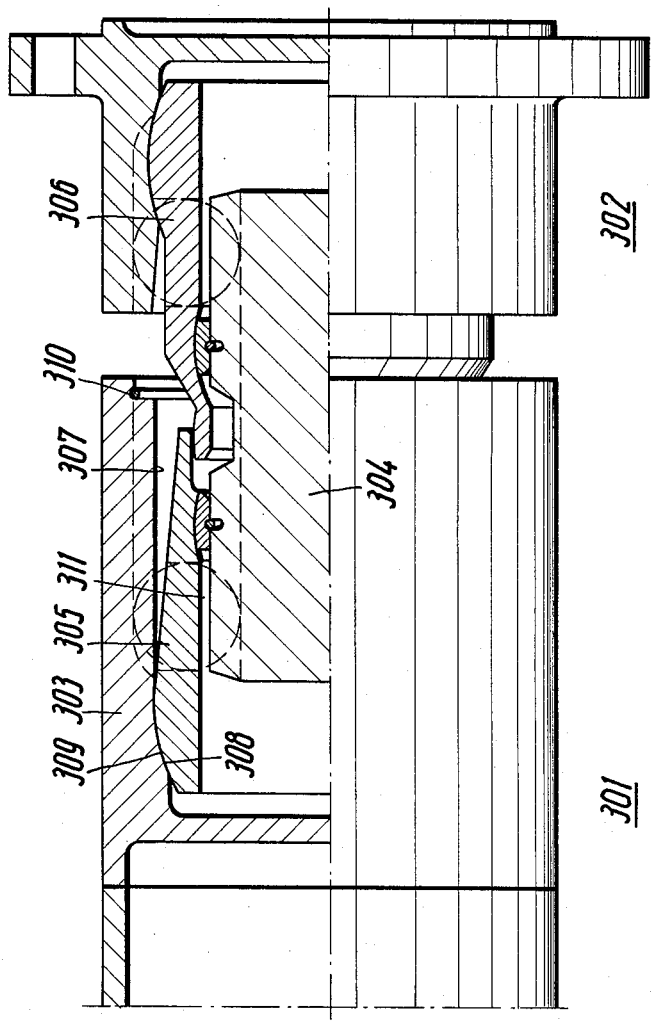
FIG. 3 is a similar view to that of FIG. 1 but of a double universal joint constructed as a sliding joint.

In FIG. 3 there is shown a double universal joint that is comparable in structure to the joint of FIGS. 1 and 2 but comprises a constant velocity universal joint 301 which is constructed as a sliding joint and a constant velocity universal joint 302 which is constructed as a fixed joint. The sliding movement in joint 301 is obtained by means of the outer joint element 303. Inner joint element 304 and the cages 305 and 306 remain fixed against axial movement with respect to each other.

The sliding of the outer joint element 303 of the constant velocity universal joint 301 is produced by a partial cylindrical surface 307. At its inner end, the cylindrical surface 307 merges into a partial convey concave spherical surface 308 which limits the path of displacement of the cage 305 as its outer spherical surface 309 slides within the cylindrical bore 307. The axial displacement of cage 305 at the other end of the cylindrical bore 307 is limited by an abutment ring 310 set into a groove on the outer joint element 303 so as to be engaged by balls 311 retained by the cage 305.

The movement of the cages of the joints 301 and 302 with respect to each other corresponds to the movement of the universal joint disclosed above in FIGS. 1 and 2. As can be seen from FIG. 3, only a slight change in the structure of the cages in the extension area is necessary in order to produce the sliding or displacement of a cage within the outer joint element of a joint. In addition, the inner element 304 is provided with a peripheral groove to accommodate the ends of the cages during bending of the joints.

Figure 4:
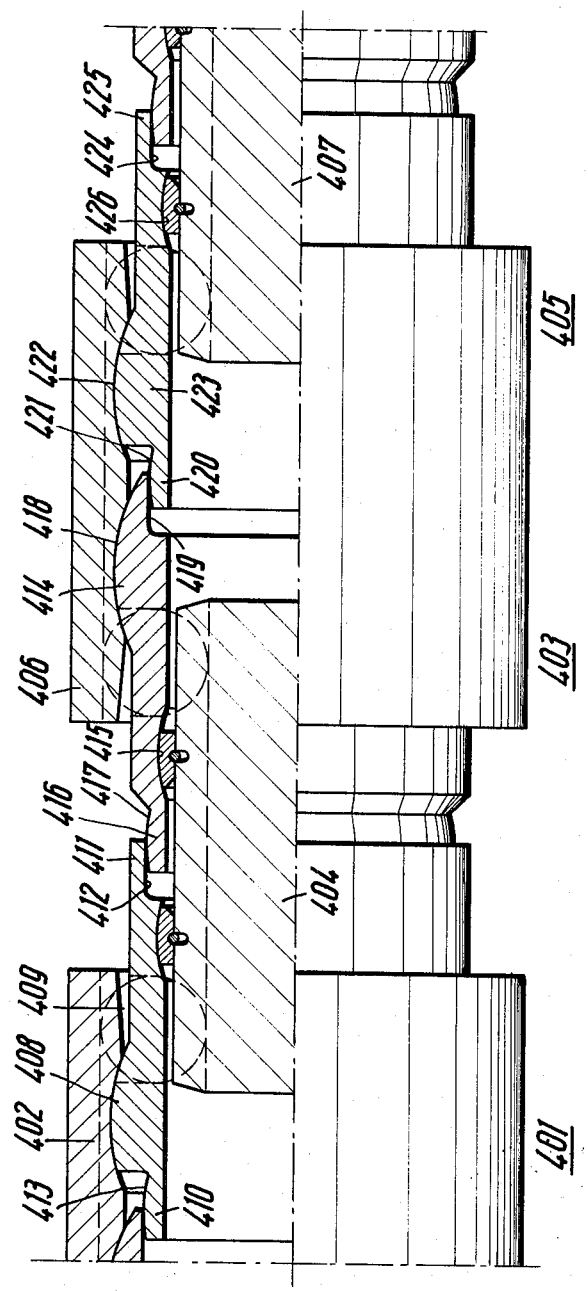
FIGS. 4 and 5 are views similar to that of FIG. 1 of multiple universal joints constructed as fixed joints and showing different structures for guiding the cages.

In FIG. 4 there is shown a portion of a constant velocity universal joint assembly constructed as a fixed joint. The total bending angle of the joint assembly is subdivided into approximately equal angles by more than two constant velocity universal joints that are coupled together.

Constant velocity universal joint 401 is provided with a unitary outer joint element 402 which is common with a further constant velocity universal joint which is not shown in the drawing. There is a unitary inner joint element 404 which is common to the constant velocity universal joint 401 and an adjacent constant velocity universal joint 403. The joint 403 has a one-piece outer joint element 406 which is common with a next adjacent constant velocity universal joint 405 which in turn is provided with an inner joint element 407 which is common with a further constant velocity universal joint which is not shown in the drawings. The number of universal joints in the assembly maybe continued in a like manner as desired.

The universal joint 401 has a cage 408 which retains balls 409 and has axial extensions 410 and 411 on both ends thereon. The extension 411 has a cylindrical bore 412 and extension 410 has a outer spherically curved surface 413. The universal joint 403 has a cage 414 having an axial extension 416 on one end thereof and provided with an outer spherically curved surface 417 which is guided in the cylindrical bore 412 of cage 408. Inwardly of the extension 416 cage 414 is provided with an inner concave spherical surface 415. The other end of cage 414 is formed with an outer spherical surface 418 with is also constructed to define an axial extension on this end of cage 414 with this extension being provided with a cylindrical bore 419 which guides an extension 420 having an outer spherical curved surface 421 on a further cage 423 of the universal joint 405. The other end of cage 403 is provided with an axial extension 425 having a cylindrical bore 424 therein and inwardly of the extension there is provided an inner concave spherical surface 426. An axial extension of a further cage having an outer peripheral curved surface is guided on the cylindrical bore 424. This further cage which is not shown in the drawings corresponds to cage 414. In the serial connection of a plurality of universal joints as described above and illustrated in FIG. 4 two different cage structures, such as 408 and 414 are required.

Figure 5:
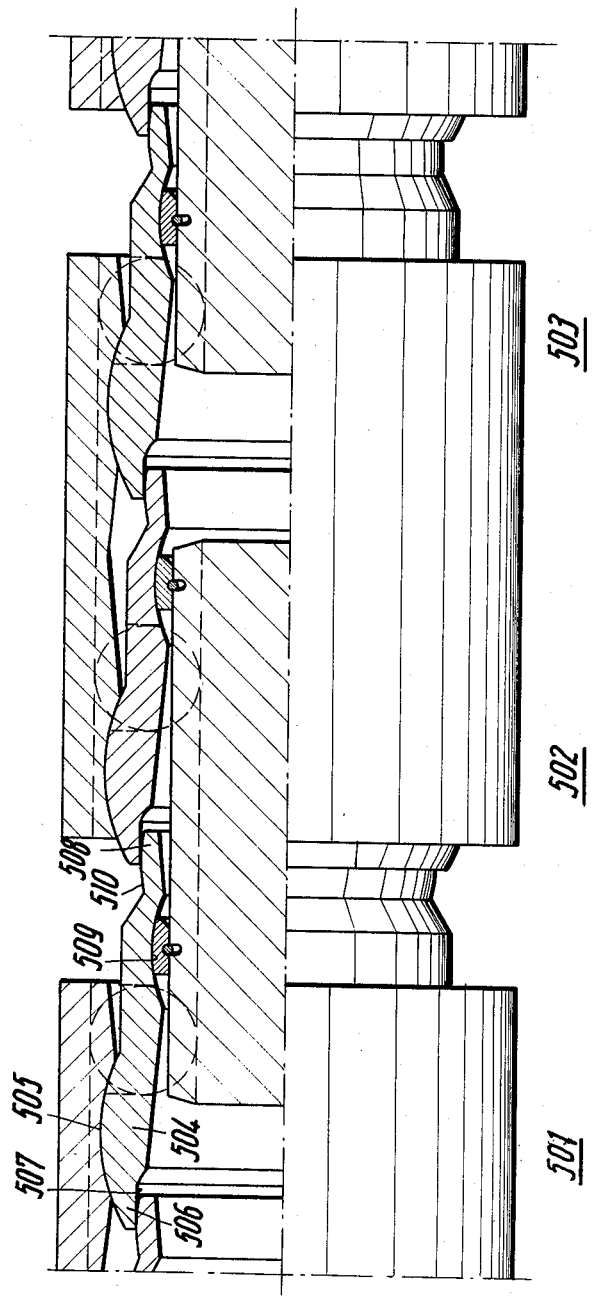

The multiple joint coupling shown in FIG. 5 is basically similar to that shown in FIG. 4, however, there is a difference in the shape and arrangement of the cages. This modification in the cage structure extends the axial dimensions of the outer and inner joint elements but is advantageous since all of the cages have the same structure.

A universal joint 501 is provided with a cage 504 which has an axial extension 506 having a cylindrical bore 507. There is an outer spherical surface 505 which extends over the extension 506. A second axial extension 508 at the other end of cage 504 outwardly of an inner concave spherical surface 509 has an outer spherically curved surface 510. The cage of the next adjacent universal joint 502 is identical to cage 504 in shape and construction and has a cylindrical bore which is guided on the outer spherical surface 510 of cage 504.

Figure 6:
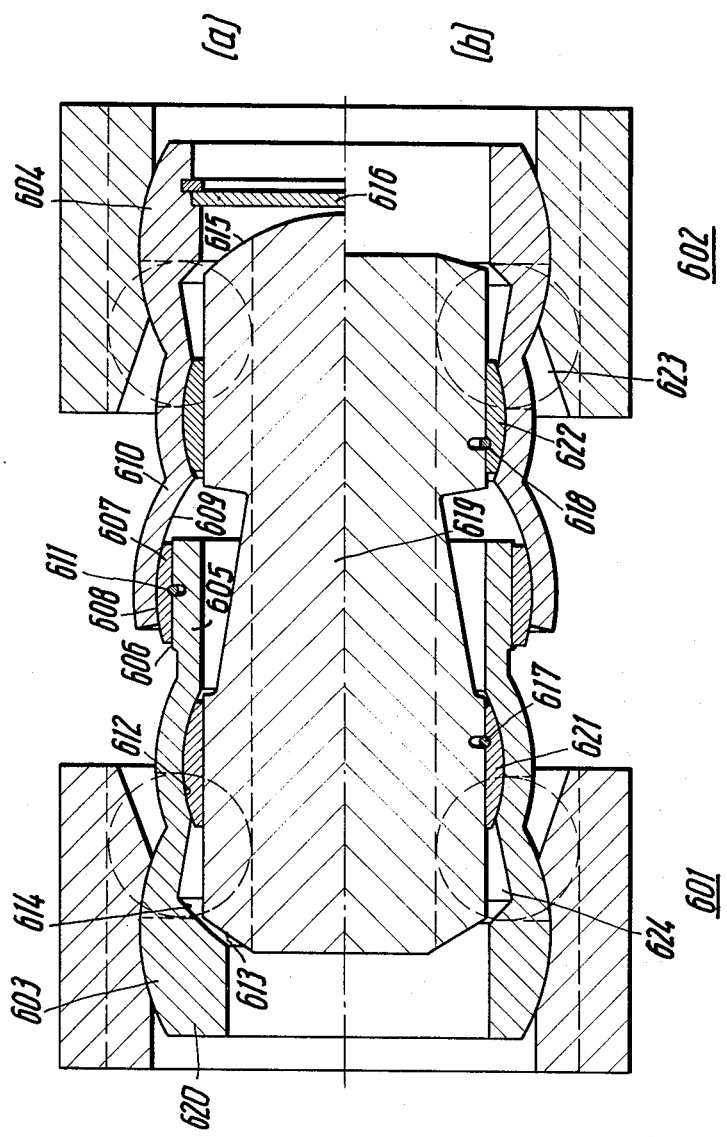
FIG. 6 is a longitudinal sectional view of a double universal joint similar to that of FIGS. 1 and 2 in which FIG. 6a thereof is constructed as fixed joint coupling and FIG. 6b thereof is constructed as a sliding joint coupling.

The double universal joint of FIG. 6 can be modified slightly so as to function both as a sliding joint and as a fixed joint coupling. This double universal joint comprises a universal joint 601 having a cage 603 with an axial extension 605 at one end thereof which has a cylindrical outer surface 606. A ring 607 which has an outer spherical surface 608 is slid onto the cylindrical surface 606 and is maintained against axial displacement by a spring or snap-ring 611 positioned in opposed grooves of ring 607 and cylindrical extension 605. The next adjacent universal joint 602 has a cage 604 provided with an axial extension 610 having an inner concave spherical surface 609 which guides the spherical surface 608 of the ring 607.

By retaining the ring 607 against axial displacement this universal joint as illustrated in FIG. 6a is constructed as a fixed joint. A unitary inner joint member 619 common to both universal joints 601 and 602 is thus limited in its axial movement by an abutment within cage 603 formed by a portion 620 having a diameter smaller than the outer diameter of inner joint element 619. The interior of the cage 603 is provided with a concave spherical surface 614 and an abutment surface 614 which may receive an outer spherical surface 613 formed on one end of the inner joint element 619. Axial movement of the inner joint element 619 in the other direction is limited by its spherically shaped end surface 615 which abuts against a disc 616 inserted in cage 604 of the other universal joint 602 with the disc being held in position by a locking or snap-ring.

FIG. 6 b shows another form of a fixed joint wherein control elements 621 and 622 of the universal joints 601 and 602 are retained against axial displacement with respect to the inner joint element 619 by means of snap-rings 617 and 618.

In order to obtain a sliding joint, the ring 607 is not fixed so as to be free for axial movement and the inner joint element 619 is thus movable to a limited extend with respect to the balls 623 and 624.

In FIG. 7 there is shown a double universal joint which is particularly adapted for relatively large bending angles, such as up to 90°. Constant velocity universal joints 701 and 702 have a common one piece outer joint element 703. Cages 704 and 705 are closed at their adjacent ends 706 and 707 with these surfaces being curved to accomodate angular movement as shown in the drawing.

Cage 705 of the joint 702 has a pin 708 extending from its end 707 with the axis of the pin being coaxial with axis $K_2$ of cage 705. The pin 708 has an outer spherical surface 709.

Cage 704 of the universal joint 701 has a bore 710 in its end portion 706 which is coaxial with the cage axis $K_1$. The spherical surface of pin 708 is guided in the bore 710. The axis of the outer joint element 703 is indicated at A and the axes of the inner joint elements are indicated at $J_1$ and $J_2$, respectively.

Figure 8A:
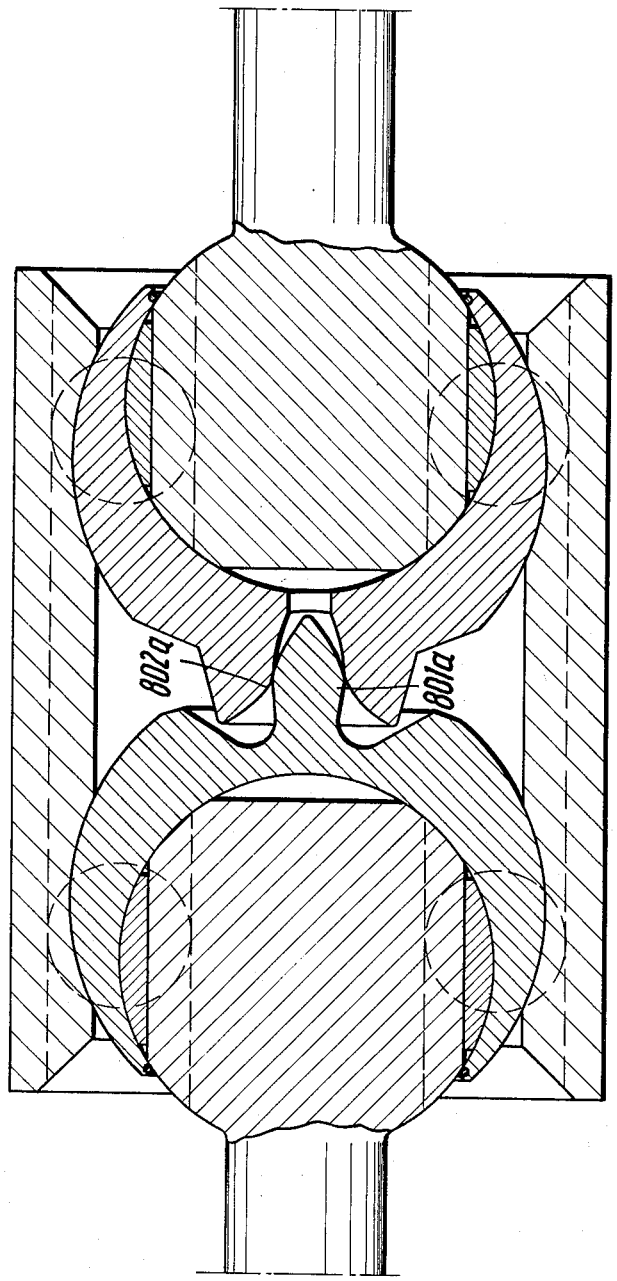
FIG. 8a is a longitudinal sectional view of a joint similar to that of FIG. 8 but disclosing a modified structure for guiding the cages.

In FIG. 8 there is shown a double universal joint consisting of individual universal joints 801 and 802 and comprising a one piece outer joint element 803. The control of cages 804 and 805 with respect to each other is performed by meshing annular teeth 806 and 807 on the ends of the cages facing each other.

In the double universal joint of FIG. 8 a, control of the cages with respect to each other is carried out by a coaxial extending tooth 801 a on the end of one cage with this tooth having a circular cross section and an involute longitudinal section. The tooth is received by a correspondingly shaped bore 802 a on the adjacent end of the other end. The rolling action between tooth 801 a and bore 802a is similar to that of meshing involute gears.

Figure 9:
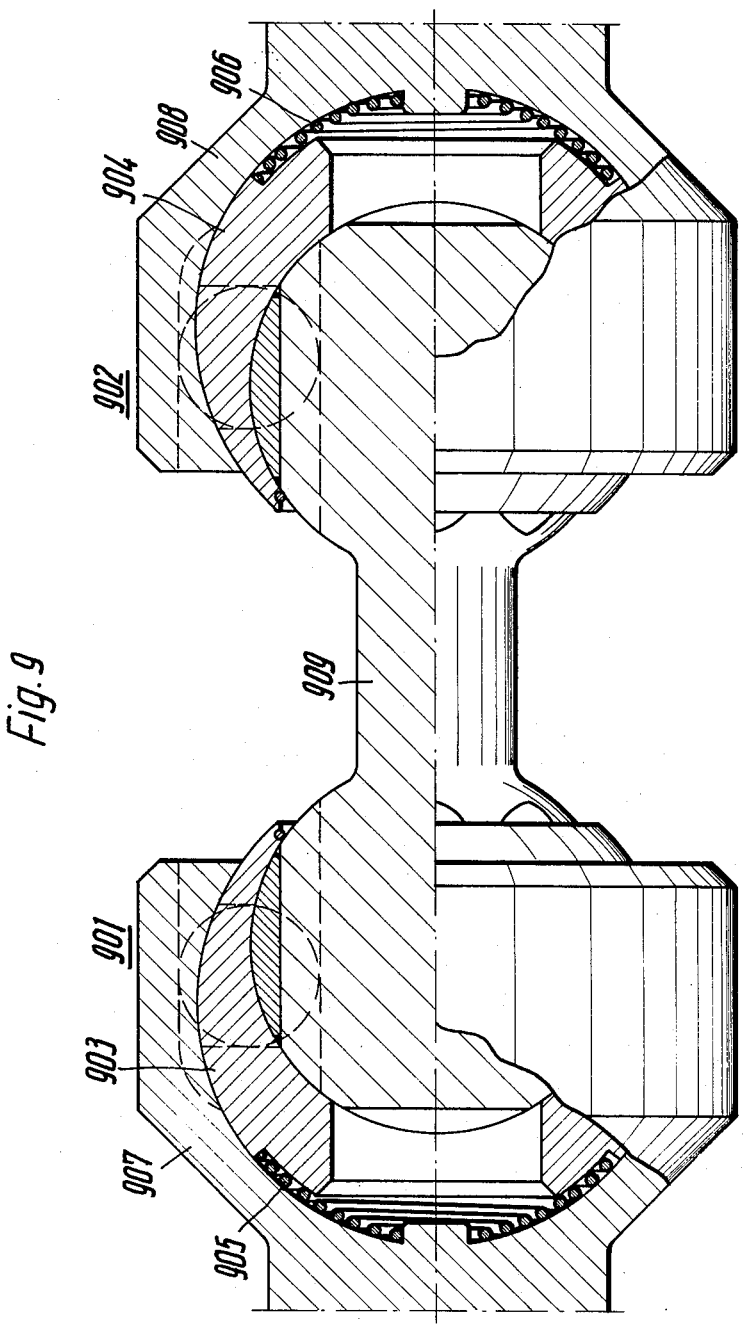
FIG. 9 is a longitudinal sectional view of still another double universal joint according to the present invention.

In FIG. 9 there is shown a double universal joint comprising separate universal joints 901 and 902 having cages 903 and 904 which are controlled by means of springs 905 and 906 respectively. These springs have the same spring characteristics so that the cages 903 and 904 are guided with respect to one another through a frictional connection induced by these springs. Springs 905 and 906 are supported on outer joint elements 907 and 908 on the one hand and on the cages 903 and 904 on the other hand. This structure is particular adapted for a double universal joint having a one piece inner joint element 909. The springs can also be supported on the inner joint element 909.

Figure 10:
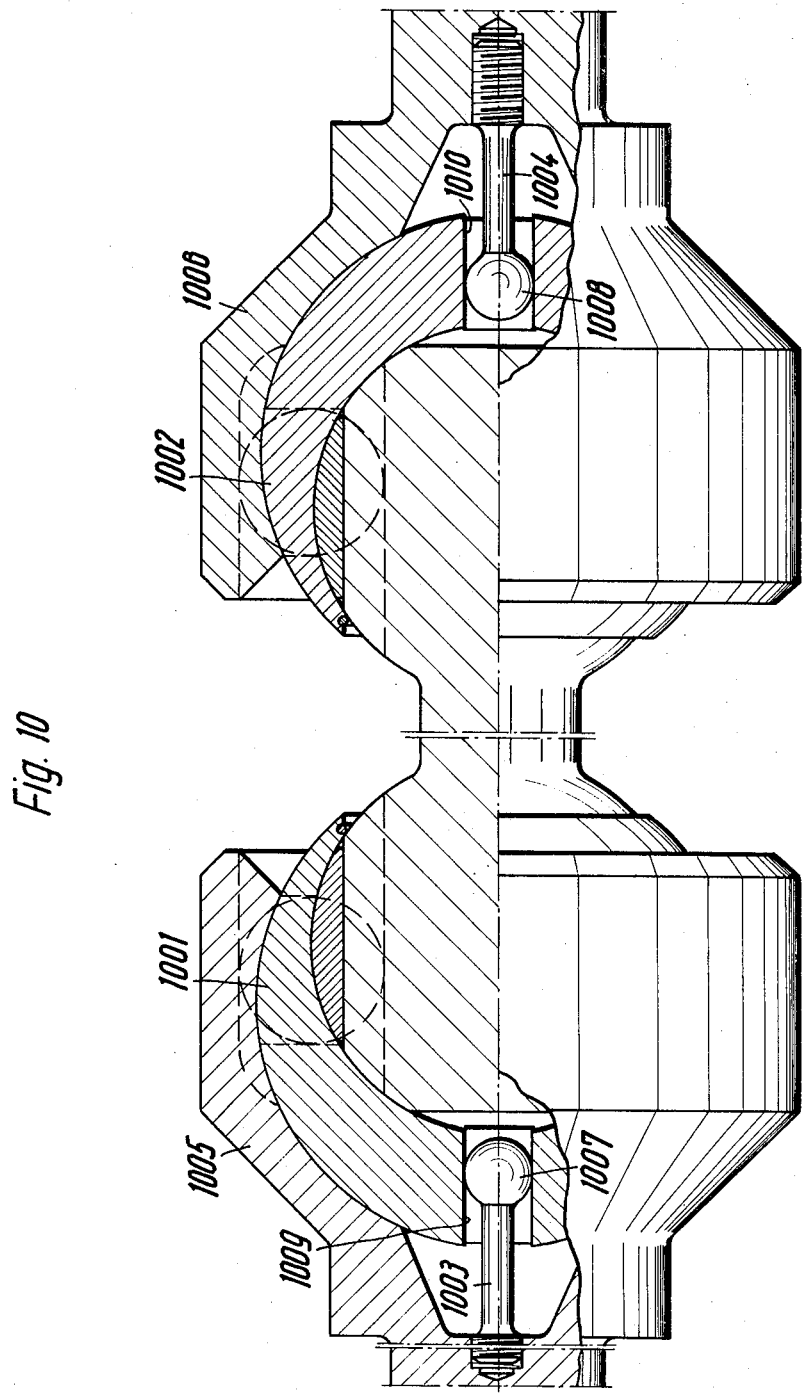
FIG. 10 is a longitudinal sectional view of still another modification according to the present invention.

In FIG. 10 there is shown a double universal joint wherein cages 1001 and 1002 are guided by flexural members or bending rods 1003 and 1004. The flexural members are inserted in the outer joint elements 1005 and 1006 with their axes being coaxial with these outer joint elements. The outer or forward ends 1007 or 1008 of the flexural members are guided in bores 1009 and 1010 of cages 1001 and 1002, respectively. The flexural members possess the same spring and bending characteristics so that during bending of the universal joint the flexural members 1003 and 1004 will function to move the cages through the same angle from the neutral or straight line position and then return these cages into this straight line position. The flexural members can also be constructed so as to be associated with the inner joint elements.

Figure 11:
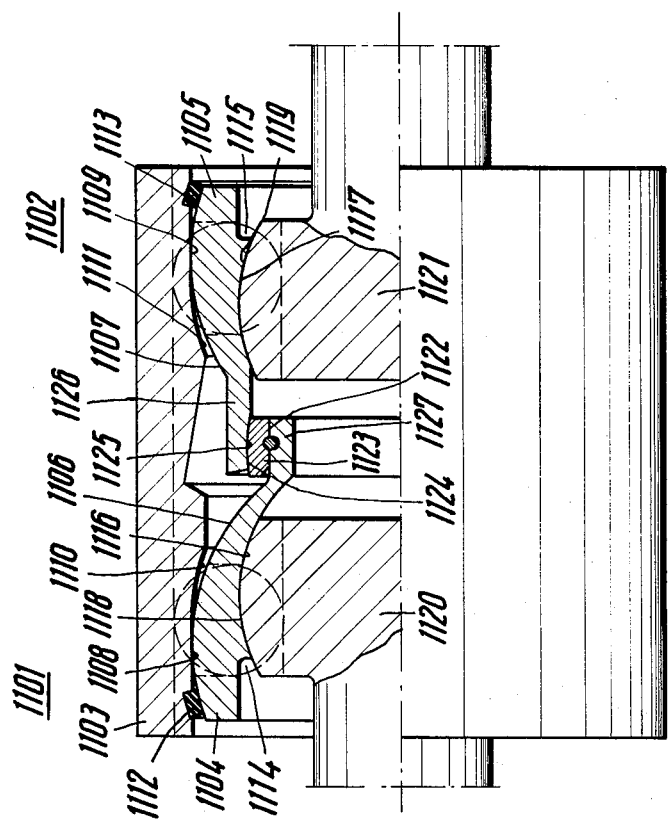
FIG. 11 is a half-longitudinal sectional view of a double universal joint constructed as a fixed joint showing another structure for guiding and supporting the cage according to the present invention.

In FIG. 11 there is shown a double universal joint constructed as a fixed joint and consisting of the separate universal joints 1101 and 1102 which have a common one piece outer joint element 1103. Cages 1104 and 1105 have outer spherical surfaces 1106 and 1107 respectively which are guided upon inner cylindrical surfaces 1108 and 1109 formed within the outer joint element. Each of these cylindrical bores continue into spherical boundary surfaces 1110 and 1111 which function to maintain the cages 1104 and 1105 against axial movement during bending of the joint. In addition, rings 1112 and 1113 can also be inserted into the cylindrical bores 1108 and 1109 to restrict axial movement. In most cases, however, the spherical boundary surfaces 1110 and 1111 or the rings 1112 andn 1113 are by themselves sufficient to limit this axial movement.

Cages 1104 and 1105 that guide and retain balls 1114 and 1115 are provided with inner concave spherical surfaces 1116 and 1117 which are guided upon outer spherical surfaces 1118 and 1119 of inner joint elements 1120 and 1121, respectively. The centers of outer spherical surfaces 1106 and 1107 and concave spherical surfaces 1116 and 1117 of cages 1104 and 1105 are located equi distantly on both sides of the respective planes passing through the centers of balls 1114 and 1115.

Cage 1104 of joint 1101 has an axial extension 1127 on one end thereof which is provided with an outer cylindrical surface 1122 onto which a ring 1123 is slid. The ring 1123 has an outer spherical surface 1124 which is guided upon a concave spherical surface 1125 formed within an axial extension 1126 on one end of cage 1105 of the joint 1102.

In a fixed joint, the ring 1123 is held on cylindrical surface 1122 against axial displacement with respect to the axial extension 1127 by means of a snap-ring or similar fastening device positioned in opposing grooves of the ring and cylindrical surface.

Figure 12:
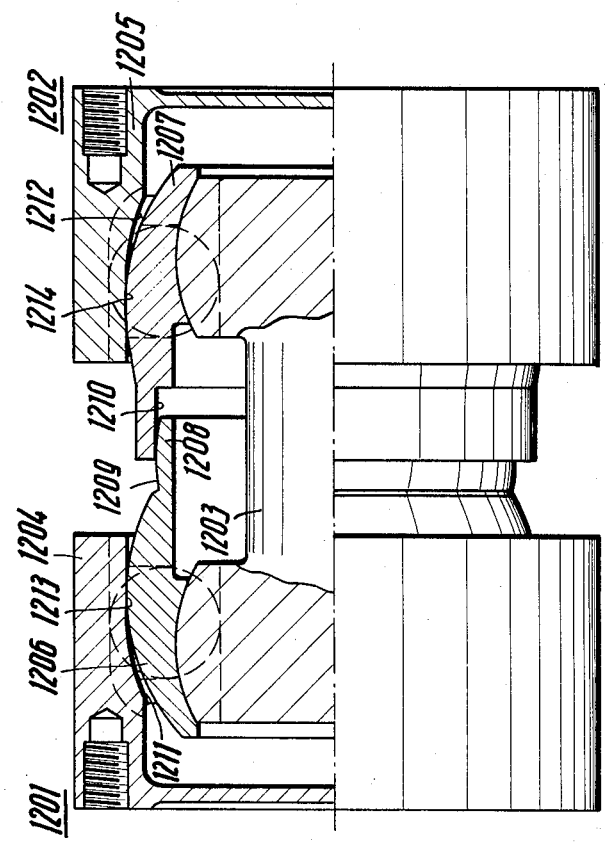
FIG. 12 is a half-longitudinal sectional view of still another double universal joint according to the present invention functioning as a sliding joint.

In FIG. 12 there is shown a double universal joint similar to the joint of FIG. 11 but constructed as a sliding joint coupling. The difference in construction resides in combining the inner joint elements of universal joints 1201 and 1202 into a single inner joint element 1203. Axial displacement is provided by the movement of outer joint elements 1204 and 1205 with respect to their respective cages 1206 and 1207 which cages are positioned so as not to have any axial displacement with respect to the inner joint element 1203.

Cage 1206 is provided with an axial extension 1208 having an outer spherical surface 1209 which is guided in a cylindrical bore 1210 in an axial extension from the adjacent end of the other cage 1207.

Inwardly directed axial movement of the outer joint elements 1204 and 1205 are limited by spherical boundary surfaces 1211 and 1212 which are continuations of cylindrical bores 1213 and 1214 of the respective outer joint elements 1204 and 1205.

Figure 13:
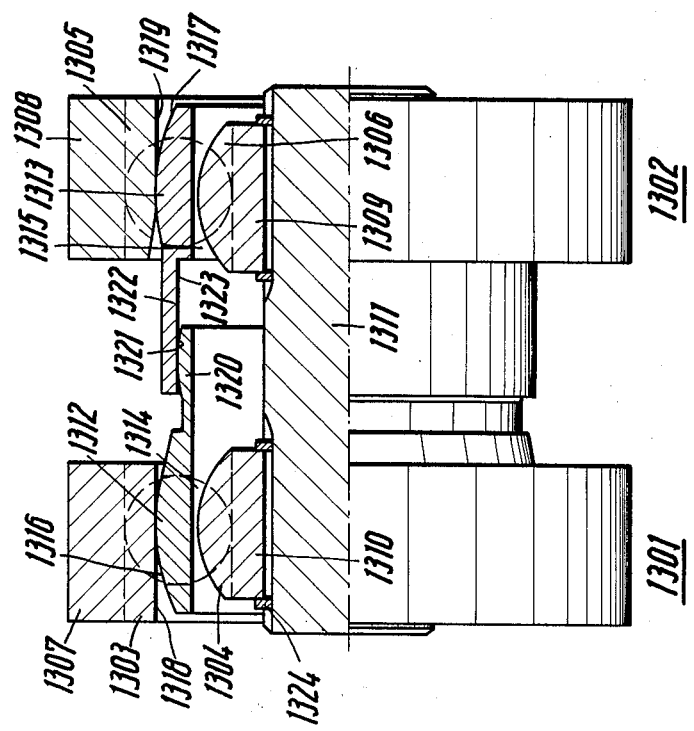
FIG. 13 is a half-longitudinal sectional view of still another double universal joint according to the present invention constructed as a sliding joint.

In FIG. 13 there is illustrated a double universal joint consisting of constant velocity universal joints 1301 and 1302 whose outer joint elements 1307 and 1308 and inner joint elements 1310 and 1309 are provided with axially extending opposed pairs of grooves 1306–1307 in which are retained balls 1314 and 1315. The inner joint elements 1309 and 1310 are firmly mounted on shaft 1311. With this structure and arrangement of the ball grooves for guiding the balls 1314 and 1315, cages 1312 and 1313 will each traverse half the displacement. The cages have respective outer spherical surfaces 1316 and 1317 which are guided in cylindrical bores 1318 and 1319 of the outer joint elements 1307 and 1308 respectively.

Cage 1312 has axial extension 1320 from one end thereof upon which is provided an outer spherical curved surface 1321 which is guided within a cylindrical bore 1323 of an axial extension 1322 from the adjacent end of cage 1313.

Figure 14:
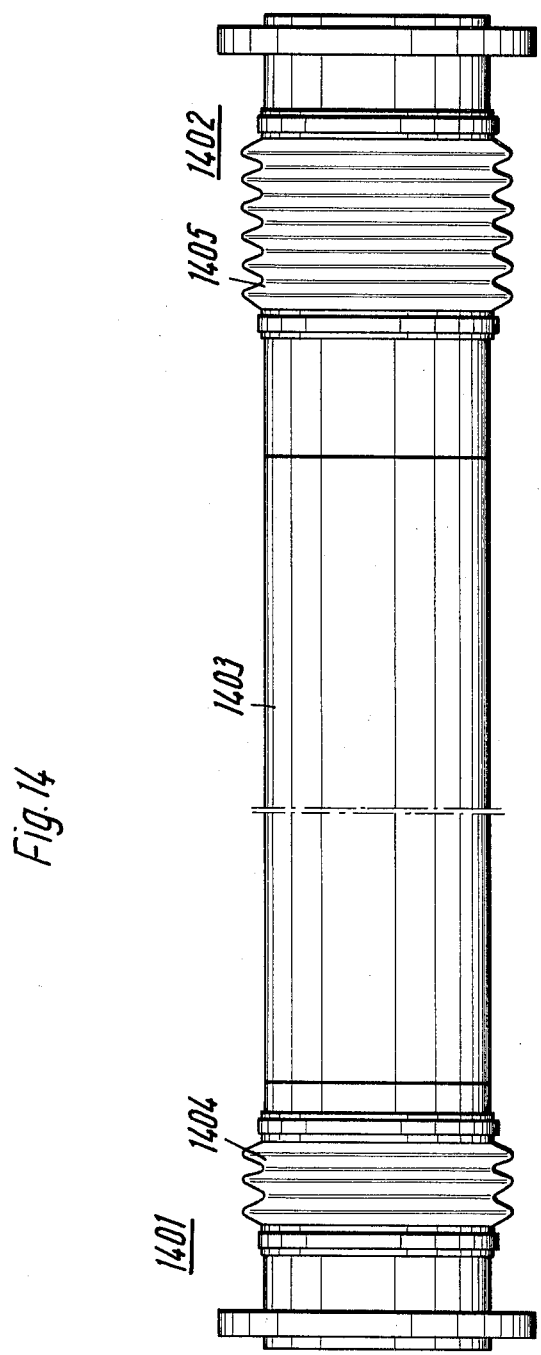
FIG. 14 is an elevational view of a universal joint shaft consisting of two double universal joints such as shown in FIGS. 1 and 3 in which the joints are connected together by a rigid intermediate shaft.

FIG. 14 illustrates a universal joint shaft which may comprise a fixed joint double universal joint 1401 as shown in FIG. 1, a sliding joint double universal joint 1402 and an intermediate rigid shaft 1403 that connects the two universal joints. Double universal joint 1401 is sealed by a boot or flexible protective sleeve 1404 and double universal joint 1402 is similarly enclosed and sealed by a protective sleeve 1405. The sleeve 1405 is somewhat longer in its axial dimension since it must bridge or span a path of axial displacement of the sliding joint. The sliding joint universal coupling 1402 may correspond to that shown in FIG. 3.

The advantages of the universal joints according to the present invention are further apparent by using separate constant velocity universal joints an outer joint element of which has an inner space which is at least partially cylindrical or concave within which is guided the spherical surface of a cage. The inner surface of the cage is also provided with a concave spherical surface which is guided upon the spherical surface of a control element mounted as a special component on the inner joint elements. The centers of the inner and outer spherical surfaces of the cage are positioned equidistantly on opposite sides of a plane passing through the centers of the balls retained within that cage. The ball grooves of the inner joint element are positioned radially within the control element at least over a substantial portion of their radial depth. In this type of joint, straight races are provided in both the inner and outer joint elements so that an axial assembly of the joint is possible and there is a displacement between the inner and outer joint elements.

While in most of the joints as described herein the total bending angle has been subdivided into two equal angles it is to be understood that the subdivided angles may have other desired relationships therebetween.

The universal joint assembly disclosed herein occupies a minimum of space while permitting a relatively large bending angle and also is capable of a significantly longer operating life since different components are utilized for controlling of the joint components and for the transmission of torque between the inner and outer joint elements.

It will be understood that this invention is susceptible to modification in order to adapt it to different usages and conditions, and accordingly, it is desired to comprehend such modifications within this invention as may fall within the scope of the appended claims.

What is claimed is:

1. In a universal joint, the combination of a plurality of constant velocity universal joints, each constant velocity universal joint comprising an outer joint element and an inner joint element having mutually opposed axially extending grooves, balls in said mutually opposed grooves to transmit torque between the joint elements, a cage between the inner and outer joint elements of each constant velocity universal joint to retain said balls therebetween, one of the corresponding joint elements of the constant velocity universal joints connected to each other, control means for guiding the cages and balls of two adjacent constant velocity universal joints to maintain constant velocity transmission, each of said cages having an axial extension on the end thereof facing the other cage, and means for guiding the mutually facing axial extensions opposite each other such that upon bending of the universal joint the said constant velocity universal joints are bent at angles which are less than the total bending angle and having a predetermined relationship to each other.

2. In a universal joint as claimed in claim 1 wherein, one of said extensions having a guide surface thereon upon which one end of the other extension is guided.

3. In a universal joint as claimed in claim 2 wherein said guide surface is a concave spherical or concave cylindrical surface and said one end of said other extension has a convex spherical or convex curves surface.

4. In a universal joint as claimed in claim 2 wherein said universal joint comprises more than two constant velocity universal joints, each cage of said joints has axial extensions on both ends thereof, one of said end extensions of a cage having an inner concave or spherical surface and the other of said end extensions having an outer spherical or curved surface.

5. In a universal joint as claimed in claim 2 wherein the guide surface of one extension comprises a cylindrical surface, an annular member on said cylindrical surface and having an outer spherical surface, the guide surface of the other extension comprising a concave spherical surface guided upon said annular member outer spherical surface.

6. In a universal joint as claimed in claim 5 and comprising means between said annular member and said cylindrical guide surface for retaining said annular member against axial displacement on said cylindrical guide surface.

7. In a universal joint as claimed in claim 1 wherein one of said cages has a pin extending coaxially therefrom, said pin having a curved or spherical outer surface, the other of said cages having a coaxial bore therein receiving the curved outer surface of said pin.

8. In a universal joint as claimed in claim 1 wherein adjacent cages have mutually opposed surfaces and meshing annular teeth on said opposed surfaces.

9. In a universal joint as claimed in claim 1 and comprising spring means for supporting said cages with respect to one of their respective joint elements.

10. In a universal joint as claimed in claim 1 and comprising a flexural member axially extending from the inner or outer joint element of each of said constant velocity universal joints and having an outer end, each cage of said constant velocity universal joints having a coaxial bore therein receiving the outer end of the respective flexural member so as to guide the constant velocity universal joints such that upon bending of the universal joint the constant velocity universal joints are each bent at angles which are less than the total bending angle and have a predetermined relationship to each other.

11. In a universal joint as claimed in claim 1 wherein said outer joint elements are tubular and each has an inner curved or spherical guide surface therein, said cages each having an outer spherical surface guided upon said outer joint element guide surfaces respectively, each of said cages having an inner spherical guide surface therein, a control element on each of said inner joint elements and each outer element having an outer spherical guide surface contacting said cage inner guide surfaces respectively, the centers of the outer spherical surfaces and inner spherical surfaces of a cage being equidistant on both sides of a plane passing through the centers of the balls retained by that cage.

12. In a universal joint as claimed in claim 11 wherein a substantial portion of the radial depth of the grooves in an inner joint element is disposed radially within its respective control element.

13. In a universal joint as claimed in claim 1 wherein one of said cages has a coaxial tooth having an involute profile extending therefrom, the other of said cages having a coaxial bore therein with a profile corresponding to that of said tooth so that said tooth rolls upon the profile surface of said bore upon bending of the universal joint.

14. In a universal joint as claimed in claim 9 wherein each of said spring means has the same spring characteristics.

* * * * *